May 2, 1933.  H. T. SEELEY  1,906,817
PROTECTIVE ARRANGEMENT
Filed Jan. 9, 1932
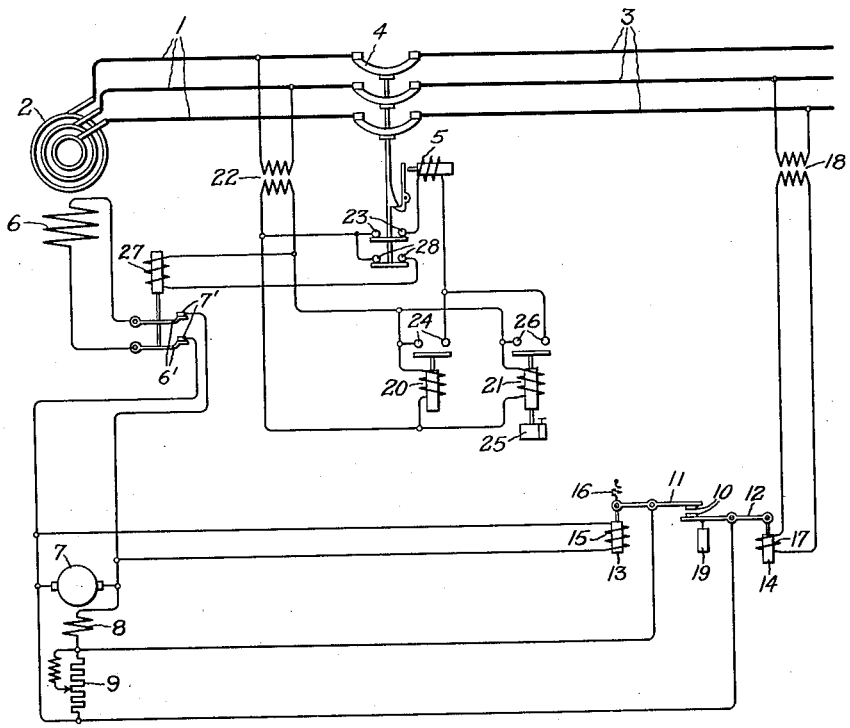
Inventor:
Harold T. Seeley
by Charles V. Mullen
His Attorney.

Patented May 2, 1933

1,906,817

UNITED STATES PATENT OFFICE

HAROLD T. SEELEY, OF LANDSDOWNE, PENNSYLVANIA, ASSIGNOR TO GENERAL ELECTRIC COMPANY, A CORPORATION OF NEW YORK

PROTECTIVE ARRANGEMENT

Application filed January 9, 1932. Serial No. 585,723.

My invention relates to the protection of electrical distribution systems and more particularly to improved protective arrangements for electrical distribution systems connected to dynamo-electric machines subjected to operating conditions tending to cause their voltages to rise above the normal operating value.

In the operation of alternating current generators the voltage of the generator tends to rise to excessive values on sudden loss of load. This is particularly true in case of water-wheel driven generators because of overspeed of the water-wheel when the generator load is suddenly decreased. The voltages of large generators or synchronous condensers also tend to rise to excessive values on complete voltage regulator failure. Since the overvoltages on dynamo-electric machines may reach 100 to 150% above the normal operating value, it is desirable in many cases to render the machine inoperative to supply current to the bus substantially instantaneously upon the attainment of a predetermined maximum safe limit of overvoltage. However, if the overvoltage on a machine is only a moderate amount above the normal operating value, but below the maximum safe limit, it is not desirable to render the machine inoperative to supply current to the bus substantially instantaneously with every overvoltage condition because there is considerable delay in getting the machine back into service and the reliability and continuity of service are jeopardized. In cases of momentary overvoltage of short duration below the maximum safe limit the voltage regulator starts to respond and may be able to bring the machine voltage back to the normal operating value before any damage is done. If the moderate overvoltage on the machine is not corrected after a definite interval of time, because of the failure of the regulator to function properly, it is desirable in many cases to disconnect the machine from the bus. This is particularly true in the case of partial failure of the regulator, or of complete failure under conditions where the limit is not sufficiently large to raise the system voltage to a dangerous value, in order to avoid overheating of the armature and field windings of the machine.

It is an object of my invention to provide an improved arrangement for protecting dynamo-electric machines and the distribution circuits connected thereto from overvoltage conditions without unduly jeopardizing the reliability and continuity of service of the distribution system. Another object of my invention is to provide an improved arrangement for protecting both the distribution circuits and dynamo-electric machines equipped with voltage regulators in systems of distribution from overvoltage conditions in accordance with the magnitude of the overvoltage when in excess of a predetermined maximum safe limit or in accordance with the duration of the overvoltage with reference to the operation of the voltage regulator when the overvoltage is in excess of a predetermined value less than the maximum safe limit.

My invention will be better understood from the following description when taken in connection with the accompanying drawing, and its scope will be pointed out with particularity in the appended claims.

In the accompanying drawing the single figure is a diagrammatic representation of an embodiment of my invention shown in connection with a three-phase alternating current generator.

Referring to the drawing, the terminals 1 of a three-phase alternating current dynamo-electric machine 2 are arranged to be connected to the conductors 3 of a distribution circuit by means of a switch 4, which may be of any suitable type, examples of which are well known in the art. As shown in the drawing, the switch 4 is of the well known latched-in type having a trip coil 5 adapted to be energized to effect the movement of the switch to a circuit opening position. The dynamo-electric machine 2 is diagrammatically illustrated as an alternating current generator having its field winding 6 energized through contacts 6' and 7' of a relay by an exciting dynamo-electric machine 7 provided with a shunt field winding 8.

In order to regulate the voltage of the generator 2 so as to maintain it at a predetermined value, an adjustable regulating resistance 9 is connected in series with the field winding 8 and arranged to be cut into and out of the exciter field circuit by some form of automatic voltage regulator, such, for instance, as a vibratory regulator of the Tirrill type, and here shown as comprising a pair of floating contacts 10 for shunting the resistance as voltage conditions may require. The contacts 10 are carried by a pair of levers 11 and 12 actuated respectively by plungers 13 and 14. The plunger 13 is operated by an electromagnetic winding 15 connected across the terminals of the exciting machine 7, the pull of winding 15 on lever 11 being opposed by a spring 16. The plunger 14 is operated by an electromagnetic winding 17, which is connected across the conductors 3 through a suitable potential transformer 18. The weight of the plunger 14 is arranged to be counterbalanced to any desired extent by a weight 19.

Now in accordance with my invention I provide means responsive to the voltage of the alternating current generator for rendering the generator inoperative to supply current to the distribution circuit by instantaneously disconnecting the generator from the distribution circuit when the generator voltage reaches a predetermined abnormal value, and by disconnecting the generator from the circuit after the lapse of a definite interval of time when the generator voltage reaches an abnormal value less than the predetermined abnormal value, so that the voltage regulator may normally bring the generator voltage back to the normal operating value before the generator is disconnected from the circuit.

Preferably the generator 2 is arranged to be disconnected from the distribution circuit 3 by two overvoltage relays 20 and 21 connected in parallel across the secondary winding of a potential transformer 22, the primary winding of which is connected across the machine terminals 1. The overvoltage relay 20 is calibrated to be operated instantaneously in accordance with a predetermined abnormal rise in the voltage of the generator 2. When the overvoltage relay 20 is energized, a circuit is completed for the trip coil 5 across the secondary winding of the transformer 22 through normally closed auxiliary contacts 23 of the switch 4 and contacts 24 of the relay 20 to effect the movement of the switch 4 to a circuit opening position. The overvoltage relay 21 may be of any suitable type, examples of which are well known in the art, which responds to a moderate overvoltage of the generator that persists for a definite interval of time. As shown in the drawing, the relay 21 is provided with a dashpot 25 as a retarding device, which may be set so that the relay will operate in accordance with a moderate voltage rise of the generator after a predetermined period of time. When the overvoltage relay 21 is energized, a circuit is completed for the trip coil 5 across the secondary winding of the transformer 22 through the auxiliary switch contacts 23 and contacts 26 of the relay 21 to effect the movement of the switch 4 to a circuit opening position. The interval of time required for the operation of the overvoltage relay 21 is of such duration that, with the regulator functioning properly, the voltage of the generator will be brought back to the normal operating value before the relay operates to effect the opening of the switch 4.

When the switch 4 moves to a circuit opening position, the generator voltage tends to rise to a higher value than it was with the switch 4 in the closed position. It is, therefore, desirable to render the exciter 7 inoperative to supply excitation current to the generator field winding 6 when the generator is disconnected from the distribution circuit, so that the generator will be protected from severe overvoltages. For this purpose I employ a relay 27 including the normally closed contacts 6' and 7', which is energized by the circuit completed across the secondary winding of the transformer 22 through normally closed auxiliary contacts 28 of the switch 4. In this arrangement the opening of the auxiliary contacts 28, due to the movement of the switch 4 to a circuit opening position, de-energizes the relay 27 to effect the separation of the contacts 6' and 7'.

The operation of the protective arrangement illustrated in the drawing is substantially as follows: It will be assumed that the generator 2 is being driven under normal operating conditions by a prime mover which tends to overspeed when load supplied by the generator is suddenly decreased, and that the exciter 7 is being operated to maintain normal voltage conditions on the circuit 3 under the influence of the regulator contacts 10. The relays and contacts are assumed to be in the positions illustrated in the drawing. In the event of a sudden decrease in load on the generator 2, the voltage thereof will rise suddenly above the normal operating value, and, as soon as the voltage reaches the excessive value for which the relay 20 is set to operate, the circuit from the secondary winding of the transformer 22 will be completed through the auxiliary switch contacts 23 and contacts 24 of the relay 20 to energize the trip coil 5 to effect the movement of the switch 4. This opens the auxiliary contacts 28, which de-energizes the relay 27 to effect the separation of the contacts 6' and 7' to disconnect the exciter 7 from the generator field winding 6.

In case the voltage of the generator does not reach the abnormal value for which the relay 20 is set to operate, but reaches a moderate overvoltage value for which the relay 21 is set to operate, there will be a lapse of a definite interval of time before the circuit through contacts 26 of the relay 21 is completed to energize the trip coil 5. In this interval of time the voltage regulator will normally be operating to bring the voltage of the generator back to the normal value for the new operating conditions of the generator before the relay 21 operates to effect the opening of the switch 4. If there is a partial or complete regulator failure, however, the moderate voltage rise will not be corrected, so that after the lapse of the definite time interval the overvoltage relay 21 will operate to effect the opening of the switch 4 and the relay 27.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is,—

1. The combination with an electrical distribution circuit, of a dynamo-electric machine, an excitation circuit therefor, a regulator for controlling said excitation circuit to maintain the voltage of said machine at a predetermined operating value, means for connecting said machine to said circuit, means operative substantially instantaneously in accordance with a departure in the magnitude of the voltage of said machine above a predetermined maximum safe limit for rendering said machine inoperative to supply current to said circuit, and means operative in accordance with a departure in the magnitude of the voltage above a predetermined value less than the predetermined maximum safe limit for rendering said machine inoperative to supply current to said circuit after a definite interval of time, said time interval being of such duration that the regulator will normally bring the machine voltage back to the predetermined normal operating value before said machine is rendered inoperative to supply current to said circuit.

2. The combination with an electrical distribution circuit, of a dynamo-electric machine, an excitation circuit therefor, a voltage regulator for controlling said excitation circuit, means for connecting said machine to said circuit, and means controlled by the voltage of said machine for effecting the opening of said connecting means substantially instantaneously in response to a rise in the voltage of said machine above a predetermined value and for effecting the opening of said connecting means after a definite interval of time in response to a moderate rise in the voltage of said machine less than said predetermined value, said time interval being of such duration that the regulator will normally correct the moderate rise of said machine voltage before said connecting means is opened.

3. The combination with an electrical distribution circuit, of a dynamo-electric machine, an excitation circuit therefor, a regulator for controlling said excitation circuit to maintain the voltage of said machine at a predetermined operating value, means for connecting said machine to said circuit, and electro-responsive means for effecting the substantial instantaneous opening of said connecting means in response to a predetermined abnormal value of machine voltage and for effecting the opening of said connecting means after a definite interval of time in response to an abnormal value of machine voltage less than said predetermined abnormal value thereof, said time interval being of such duration that the regulator will normally bring the machine voltage back to the predetermined operating value before said connecting means is opened.

4. The combination with an electrical distribution circuit, of a dynamo-electric machine, an excitation circuit therefor, a voltage regulator for controlling said excitation circuit, means for connecting said machine to said circuit, a relay operative in accordance with a rise in the voltage of said machine above a predetermined value for effecting the substantial instantaneous opening of said connecting means, and a time delay relay operative in accordance with a moderate rise in the voltage of said machine less than said predetermined value for effecting the opening of said connecting means after a definite interval of time, said time interval being of such duration that said regulator will normally correct the moderate rise in said machine voltage before said connecting means is opened.

In witness whereof, I have hereunto set my hand.

HAROLD T. SEELEY.